United States Patent
Fosback et al.

(10) Patent No.: US 9,729,609 B2
(45) Date of Patent: Aug. 8, 2017

(54) AUTOMATIC TRANSPORT DISCOVERY FOR MEDIA SUBMISSION

(75) Inventors: Jason Robert Fosback, Edmonds, WA (US); Ricardo D. Cortes, Los Gatos, CA (US); Max Muller, San Jose, CA (US)

(73) Assignee: APPLE INC., Cupertino, CA (US)

( * ) Notice: Subject to any disclaimer, the term of this patent is extended or adjusted under 35 U.S.C. 154(b) by 1204 days.

(21) Appl. No.: 12/538,050

(22) Filed: Aug. 7, 2009

(65) Prior Publication Data
US 2011/0035508 A1 Feb. 10, 2011

(51) Int. Cl.
*G06F 15/16* (2006.01)
*H04L 29/08* (2006.01)
*H04L 29/06* (2006.01)

(52) U.S. Cl.
CPC ............. *H04L 67/06* (2013.01); *H04L 69/18* (2013.01)

(58) Field of Classification Search
CPC ...................................................... H04L 67/06
See application file for complete search history.

(56) References Cited

U.S. PATENT DOCUMENTS

| | | |
|---|---|---|
| 4,750,119 A | 6/1988 | Cohen et al. |
| 5,253,165 A | 10/1993 | Leiseca et al. |
| 5,410,598 A | 4/1995 | Shear |
| 5,535,383 A | 7/1996 | Gower |
| 5,627,973 A | 5/1997 | Armstrong et al. |
| 5,752,128 A | 5/1998 | Yamashita |
| 5,765,152 A | 6/1998 | Erickson |
| 5,884,280 A | 3/1999 | Yoshioka et al. |
| 5,943,422 A | 8/1999 | Van |
| 6,067,531 A | 5/2000 | Hoyt et al. |
| 6,085,253 A | 7/2000 | Blackwell et al. |
| 6,151,643 A | 11/2000 | Cheng |
| 6,226,618 B1 | 5/2001 | Downs et al. |
| 6,233,682 B1 | 5/2001 | Fritsch |
| 6,236,313 B1 | 5/2001 | Milsted et al. |
| 6,263,313 B1 | 7/2001 | Milsted |
| 6,275,954 B1 | 8/2001 | Herman et al. |

(Continued)

FOREIGN PATENT DOCUMENTS

| | | |
|---|---|---|
| EP | 1 684 223 A1 | 7/2006 |
| EP | 1684223 | 7/2006 |

(Continued)

OTHER PUBLICATIONS

"Liquifier Pro 4.0 for Windows™ User's Guide," 1998, Liquid Audio, Inc.

(Continued)

*Primary Examiner* — Karen Tang
(74) *Attorney, Agent, or Firm* — DLA Piper LLP (US)

(57) ABSTRACT

Systems and methods for transporting media content data over a network to a media submission system are disclosed. A client media submission program may be provided that supports media submission to the media submission system using a plurality of transport mechanisms. One of the transport mechanisms to be utilized for the media submission may be determined based at least in part on configuration criteria. The media content data may be submitted over the network to the media submission system using the determined one of the transport mechanisms.

25 Claims, 8 Drawing Sheets

(56) References Cited

U.S. PATENT DOCUMENTS

| | | |
|---|---|---|
| 6,330,670 B1 | 12/2001 | England et al. |
| 6,338,044 B1 | 1/2002 | Cook et al. |
| 6,341,353 B1 | 1/2002 | Herman et al. |
| 6,345,256 B1 | 2/2002 | Milsted et al. |
| 6,363,486 B1 | 3/2002 | Knapton |
| 6,363,488 B1 | 3/2002 | Ginter et al. |
| 6,385,596 B1 | 5/2002 | Wiser et al. |
| 6,389,592 B1 | 5/2002 | Ayres et al. |
| 6,546,555 B1 | 4/2003 | Hjelsvold et al. |
| 6,549,922 B1 | 4/2003 | Srivastava et al. |
| 6,587,837 B1 | 7/2003 | Spagna et al. |
| 6,591,420 B1 | 7/2003 | McPherson et al. |
| 6,658,476 B1 * | 12/2003 | Van .................. 709/230 |
| 6,691,149 B1 | 2/2004 | Yokota et al. |
| 6,731,312 B2 | 5/2004 | Robbin |
| 6,754,895 B1 | 6/2004 | Bartel et al. |
| 6,873,992 B1 | 3/2005 | Thomas |
| 6,874,003 B2 | 3/2005 | Morohashi |
| 6,910,049 B2 | 6/2005 | Fenton et al. |
| 6,937,168 B2 | 8/2005 | Iverson et al. |
| 6,938,005 B2 | 8/2005 | Iverson et al. |
| 7,073,193 B2 | 7/2006 | Marsh |
| 7,076,445 B1 | 7/2006 | Cartwright |
| 7,209,892 B1 | 4/2007 | Galuten et al. |
| 7,275,243 B2 | 9/2007 | Gibbons et al. |
| 7,292,980 B1 | 11/2007 | August et al. |
| 7,308,413 B1 | 12/2007 | Tota et al. |
| 7,383,233 B1 | 6/2008 | Singh et al. |
| 7,624,046 B2 | 11/2009 | Galuten et al. |
| 7,685,512 B2 | 3/2010 | Hanson et al. |
| 7,729,946 B2 | 6/2010 | Chu |
| 7,739,256 B2 | 6/2010 | Powell |
| 7,756,920 B2 | 7/2010 | Muller et al. |
| 7,827,162 B2 | 11/2010 | Suitts et al. |
| 7,844,548 B2 | 11/2010 | Robbin et al. |
| 7,860,830 B2 | 12/2010 | Mirrashidi et al. |
| 7,962,634 B2 | 6/2011 | Cortos et al. |
| 8,015,237 B2 | 9/2011 | Muller et al. |
| 2001/0021926 A1 | 9/2001 | Schneck et al. |
| 2001/0037207 A1 | 11/2001 | Dejaeger |
| 2001/0044786 A1 | 11/2001 | Ishibashi |
| 2001/0054046 A1 | 12/2001 | Mikhailov et al. |
| 2002/0002541 A1 | 1/2002 | Williams |
| 2002/0004824 A1 | 1/2002 | Cuan et al. |
| 2002/0032658 A1 | 3/2002 | Oki et al. |
| 2002/0047899 A1 | 4/2002 | Son et al. |
| 2002/0049844 A1 | 4/2002 | Nishikawa |
| 2002/0073177 A1 | 6/2002 | Clark et al. |
| 2002/0077986 A1 | 6/2002 | Kobata et al. |
| 2002/0078211 A1 * | 6/2002 | Natarajan et al. .......... 709/228 |
| 2002/0082857 A1 | 6/2002 | Skordin et al. |
| 2002/0087440 A1 | 7/2002 | Blair et al. |
| 2002/0091584 A1 | 7/2002 | Clark et al. |
| 2002/0099661 A1 | 7/2002 | Kii et al. |
| 2002/0099696 A1 | 7/2002 | Prince |
| 2002/0099801 A1 | 7/2002 | Ishii |
| 2002/0107803 A1 | 8/2002 | Lisanke et al. |
| 2002/0112171 A1 | 8/2002 | Ginter et al. |
| 2002/0116293 A1 | 8/2002 | Lao et al. |
| 2002/0124182 A1 | 9/2002 | Bacso et al. |
| 2002/0143612 A1 | 10/2002 | Barik et al. |
| 2002/0143782 A1 | 10/2002 | Headings et al. |
| 2002/0152267 A1 | 10/2002 | Lennon |
| 2002/0152278 A1 | 10/2002 | Pontenzone et al. |
| 2002/0165811 A1 | 11/2002 | Ishii et al. |
| 2002/0186844 A1 | 12/2002 | Levy et al. |
| 2002/0198843 A1 | 12/2002 | Wang et al. |
| 2003/0005173 A1 | 1/2003 | Shah et al. |
| 2003/0021283 A1 | 1/2003 | See et al. |
| 2003/0033162 A1 | 2/2003 | Houssiaux et al. |
| 2003/0037242 A1 | 2/2003 | Yasuna et al. |
| 2003/0065717 A1 | 4/2003 | Saito et al. |
| 2003/0074465 A1 | 4/2003 | Tang et al. |
| 2003/0115144 A1 | 6/2003 | Stefik et al. |
| 2003/0120593 A1 | 6/2003 | Bansai et al. |
| 2003/0120928 A1 | 6/2003 | Cato et al. |
| 2003/0135424 A1 | 7/2003 | Davis et al. |
| 2003/0149742 A1 | 8/2003 | Bollerud |
| 2003/0182188 A1 | 9/2003 | Duchow |
| 2003/0208473 A1 | 11/2003 | Lennon et al. |
| 2003/0226150 A1 | 12/2003 | Berberet et al. |
| 2003/0236886 A1 | 12/2003 | Oren et al. |
| 2004/0012618 A1 | 1/2004 | Finney |
| 2004/0015427 A1 | 1/2004 | Camelio |
| 2004/0015445 A1 | 1/2004 | Heaven |
| 2004/0034601 A1 | 2/2004 | Kreuzer |
| 2004/0039754 A1 | 2/2004 | Harple |
| 2004/0044949 A1 | 3/2004 | Rowe |
| 2004/0059929 A1 | 3/2004 | Rodgers et al. |
| 2004/0133605 A1 | 7/2004 | Chang et al. |
| 2004/0136698 A1 | 7/2004 | Mock et al. |
| 2004/0143760 A1 | 7/2004 | Alkove et al. |
| 2004/0148598 A1 | 7/2004 | Kita et al. |
| 2004/0153968 A1 | 8/2004 | Ching et al. |
| 2004/0167858 A1 | 8/2004 | Erickson |
| 2004/0181459 A1 | 9/2004 | Wright |
| 2004/0205028 A1 | 10/2004 | Verosub et al. |
| 2004/0210481 A1 | 10/2004 | Quinlan et al. |
| 2004/0215733 A1 | 10/2004 | Gondhalekar et al. |
| 2004/0254883 A1 | 12/2004 | Kondrk et al. |
| 2004/0254949 A1 | 12/2004 | Amirthalingam |
| 2004/0267552 A1 | 12/2004 | Gilliam et al. |
| 2004/0267608 A1 | 12/2004 | Mansfield, Jr. |
| 2004/0268451 A1 | 12/2004 | Robbin et al. |
| 2005/0015765 A1 | 1/2005 | Covell et al. |
| 2005/0021478 A1 | 1/2005 | Gautier et al. |
| 2005/0034164 A1 | 2/2005 | Sano et al. |
| 2005/0038813 A1 | 2/2005 | Apparao et al. |
| 2005/0044524 A1 | 2/2005 | Murray et al. |
| 2005/0050218 A1 | 3/2005 | Sheldon et al. |
| 2005/0050345 A1 | 3/2005 | Dowdy et al. |
| 2005/0071418 A1 | 3/2005 | Kjellberg et al. |
| 2005/0080743 A1 | 4/2005 | Ostrover et al. |
| 2005/0080788 A1 | 4/2005 | Murata |
| 2005/0144635 A1 | 6/2005 | Boortz |
| 2005/0165656 A1 | 7/2005 | Frederick et al. |
| 2005/0182792 A1 | 8/2005 | Israel et al. |
| 2005/0197946 A1 | 9/2005 | Williams et al. |
| 2005/0216472 A1 | 9/2005 | Leon et al. |
| 2005/0232227 A1 * | 10/2005 | Jorgenson et al. .......... 370/351 |
| 2005/0240529 A1 | 10/2005 | Thomas |
| 2005/0246193 A1 | 11/2005 | Roever et al. |
| 2005/0267894 A1 | 12/2005 | Camahan |
| 2005/0278375 A1 | 12/2005 | Mitchko et al. |
| 2005/0283394 A1 | 12/2005 | McGloin et al. |
| 2006/0008256 A1 | 1/2006 | Khedouri et al. |
| 2006/0015489 A1 | 1/2006 | Probst et al. |
| 2006/0041748 A1 | 2/2006 | Lockhart et al. |
| 2006/0048132 A1 | 3/2006 | Chen et al. |
| 2006/0062426 A1 | 3/2006 | Levy et al. |
| 2006/0074754 A1 | 4/2006 | Toyohara et al. |
| 2006/0107046 A1 | 5/2006 | Raley et al. |
| 2006/0112101 A1 | 5/2006 | Young |
| 2006/0143264 A1 | 6/2006 | Payne |
| 2006/0161604 A1 | 7/2006 | Lobo |
| 2006/0167751 A1 | 7/2006 | Maruyama |
| 2006/0167816 A1 | 7/2006 | Wang et al. |
| 2006/0212722 A1 | 9/2006 | Ginter et al. |
| 2006/0229929 A1 | 10/2006 | Hughes |
| 2006/0242640 A1 | 10/2006 | Pauly |
| 2006/0272026 A1 | 11/2006 | Niwano et al. |
| 2006/0277096 A1 | 12/2006 | Levitus |
| 2006/0287966 A1 | 12/2006 | Srinivasaraghavan et al. |
| 2007/0011156 A1 | 1/2007 | Maron |
| 2007/0011178 A1 | 1/2007 | Dumitru et al. |
| 2007/0011709 A1 | 1/2007 | Katz et al. |
| 2007/0028269 A1 | 2/2007 | Nezu et al. |
| 2007/0033531 A1 | 2/2007 | Marsh |
| 2007/0050467 A1 | 3/2007 | Borrett et al. |
| 2007/0073694 A1 | 3/2007 | Picault et al. |
| 2007/0083471 A1 | 4/2007 | Robbin et al. |
| 2007/0106522 A1 | 5/2007 | Collins |
| 2007/0108274 A1 | 5/2007 | Boardman et al. |
| 2007/0192352 A1 | 8/2007 | Levy |

(56) References Cited

U.S. PATENT DOCUMENTS

| | | |
|---|---|---|
| 2007/0208670 A1 | 9/2007 | Quoc |
| 2007/0220051 A1 | 9/2007 | Brentano et al. |
| 2007/0261088 A1 | 11/2007 | Phillips et al. |
| 2007/0265969 A1 | 11/2007 | Horwat et al. |
| 2007/0266028 A1 | 11/2007 | Muller et al. |
| 2007/0266047 A1 | 11/2007 | Cortes et al. |
| 2008/0040379 A1 | 2/2008 | Suitts et al. |
| 2008/0071614 A1 | 3/2008 | Mebruer |
| 2008/0120199 A1 | 5/2008 | Pirnack et al. |
| 2008/0133594 A1 | 6/2008 | Fotinatos et al. |
| 2008/0140493 A1 | 6/2008 | DeAngelis |
| 2008/0140537 A1 | 6/2008 | Powell |
| 2008/0147530 A1 | 6/2008 | Kwan et al. |
| 2008/0147558 A1 | 6/2008 | Kraus |
| 2008/0155552 A1* | 6/2008 | Kim ............... 718/105 |
| 2008/0195651 A1 | 8/2008 | Rachmiel et al. |
| 2008/0249946 A1 | 10/2008 | Candelore |
| 2008/0288405 A1 | 11/2008 | John |
| 2008/0301058 A1 | 12/2008 | Campbell et al. |
| 2009/0037287 A1 | 2/2009 | Baitalmal et al. |
| 2009/0063543 A1 | 3/2009 | Martin et al. |
| 2009/0138117 A1 | 5/2009 | Bagwell et al. |
| 2009/0198830 A1* | 8/2009 | Zhang et al. ............ 709/233 |
| 2009/0240552 A1 | 9/2009 | Yang |
| 2009/0259502 A1 | 10/2009 | Erlewine et al. |
| 2009/0260060 A1 | 10/2009 | Smith et al. |
| 2009/0276332 A1 | 11/2009 | Gharabally et al. |
| 2009/0276333 A1 | 11/2009 | Cortes et al. |
| 2009/0276433 A1 | 11/2009 | Fosback et al. |
| 2009/0307201 A1 | 12/2009 | Dunning et al. |
| 2009/0307682 A1 | 12/2009 | Gharabally |
| 2009/0307683 A1 | 12/2009 | Gharabally |
| 2010/0114739 A1 | 5/2010 | Johnston |
| 2010/0115443 A1 | 5/2010 | Richstein |
| 2010/0205274 A1 | 8/2010 | Gharabally et al. |
| 2010/0235254 A1 | 9/2010 | Chu et al. |
| 2010/0235889 A1 | 9/2010 | Chu et al. |
| 2010/0251099 A1 | 9/2010 | Makower et al. |
| 2010/0299219 A1 | 11/2010 | Cortes et al. |
| 2011/0023001 A1 | 1/2011 | Giffel |
| 2011/0035579 A1 | 2/2011 | Miura et al. |
| 2011/0060776 A1 | 3/2011 | Suitts et al. |
| 2011/0197285 A1 | 8/2011 | Ginter et al. |
| 2012/0023015 A1 | 1/2012 | Mathai et al. |
| 2012/0110317 A1 | 5/2012 | Scheer et al. |

FOREIGN PATENT DOCUMENTS

| | | |
|---|---|---|
| EP | 2 230 620 A1 | 9/2010 |
| JP | 2002-328852 | 1/1900 |
| JP | A 2002-041482 | 2/2002 |
| JP | 2006-519637 | 8/2006 |
| JP | A 2006-272000 | 10/2006 |
| JP | A 2007-220062 | 8/2007 |
| JP | A 2008-142548 | 6/2008 |
| JP | A 2009-048340 | 3/2009 |
| WO | WO 97/04410 | 2/1997 |
| WO | WO 98/49644 | 11/1998 |
| WO | WO 00/08909 | 2/2000 |
| WO | WO 02/48920 | 6/2002 |
| WO | WO 2004/019182 A2 | 3/2004 |

OTHER PUBLICATIONS

Radified Guide to Ripping & Encoding CD Audio, http://mp3.radified.com, downloaded Oct. 7, 2003, pp. 1-5.

"Music Collector Features," Collectorz.cona music collector features, http://www.collectorz.com/music/features.php, downloaded Oct. 7, 2003, pp. 1-2.

"Gracenote CDDB," Gracenote, product webpage, http://www.gracenote.com/gn_products/cddb.html, downloaded Oct. 7, 2003, pp. 1-2.

"Gracenote MusicID," Gracenote, product webpage, http://www.gracenote.com/gn_products/music_id.html, downloaded Oct. 7, 2003, pp. 1-2.

"AVCataloger Overview," NC Software, Inc. http://www.avcataloger.com/Products.aspx, downloaded Oct. 6, 2003, pp. 1-4.

Jyri Huopaniemi, "Music Encoding and Transmission," CUIDAD meeting, ICMC 2000 Berlin, Aug. 28, 2000.

"Media Encoding FAQ," Loudeye Corp., http://www.loudeye.com/digitalmedia/solutions/mediaenchost/encodingfaq.asp, downloaded Oct. 9, 2003, pp. 1-3.

"Media encoding datasheet," Loudeye Corp., http://www.loudeye.com/digitalmedia/solutions/mediaenchost/encoding.asp, downloaded Oct. 9, 2003, pp. 1-4.

"Media hosting datasheet," Loudeye Corp. http://www.loudeye.com/digitalmedia/solutions/mediaenchost/hosting.asp, downloaded Oct. 9, 2003, pp. 1-2.

"Preview and Convera Announce Availability of Digital Media Commerce Platform for Secure Digital Audio Devices," Convera Press release, Las Vegas, NV, Consumer Electronics Show, Jan. 8, 2001, pp. 1-3.

Sonopress Global Network User Manual, Client Tools, Upload Data/Graphics Files to Sonopress, Sonopress, date unknown.

MPEG-7 Multimedia Description Schemes XM (Version 2.0), ISO/IEC, Mar. 2000, pp. 1-138.

"Digital Audio Best Practices Version 2.1", by Digital Audio Working Group, Oct. 2006, http:/www.mndigital.org.digitizing/standards/audio.pdf.

Vartiainen et al. "Auto-updated", Proceedings of the 4th International Conference on Mible Technology, Applications, and Systems and the 1st International Symposium on Computer Human Interactionin Mobile Technology, Mobility '07, Jan. 1 2007, p. 683.

\* cited by examiner

AUTOMATIC TRANSPORT DISCOVERY FOR MEDIA SUBMISSION

BACKGROUND OF THE INVENTION

Field of the Invention

The present invention relates to electronic transmission of media content and, more particularly, to electronic submission of media content for purposes of media purchase or distribution.

Description of the Related Art

Traditionally, music and movies has been purchased at music stores or video stores, or at music or video departments of larger stores. A consumer will visit the music or video store (or music or video) department and manually browse for music or movies, or similar media content of interest, on albums or compact discs (CDs) or digital video discs (DVDs) or high definition video discs. After the consumer selects the media content of interest, the consumer proceeds to a check-out register to pay for the music or movies being purchased.

In recent years, media delivery or distribution over the Internet has become popular. Today, various online media hosting sites permit virtual visitors to purchase and download albums or songs via the Internet (e.g., World Wide Web). However, in order for music or movies to be offered for purchase and download, the electronic content for the music or movies must first be provided to the media hosting sites.

Conventionally, a music label or movie studio desirous of selling their productions online produce a tape or disc, and then physically mail the tape or disc to a representative for the media hosting site. More recently, music labels and movie studios have electronically transmitted their productions to the media hosting site, via the Internet. While the Internet may provide many conveniences, such as sending e-mails with file attachments, conventional e-mails with attachments of very large files may be inefficient, may be ineffective, or may fail in transmitting the very large files.

Unfortunately, very large files are typically associated with the productions of music labels and movie studios. For example: data may total approximately seven hundred megabytes for a very large file (or collection of files) associated with an eighty minute music album; data may total approximately eight gigabytes for a very large file (or collection of files) associated with a DVD resolution feature length film, or a large collection of music videos or concert performances. Furthermore, a file or collection of files associated with high definition video can be even larger. For example, feature length movies encoded in ProRes 422 (HQ) may be as large as approximately six-hundred gigabytes or more. Accordingly, it should be understood that attendant difficulties may be encountered by music studios or movie studios when they attempt to electronically transmitted such very large files of their productions to the media hosting site, via the Internet.

Various different network transport methods may help to overcome such difficulties. Naturally, transport speed and efficiency are always at issue, in choosing suitable transport methods, since the media content files are so large. However, choice of transport methods is greatly complicated by additional competing, cross-cutting concerns such as security, cost, load balancing, reliability, convenience, ease of use, and current availability.

For example, while a studio's network firewalls may provide them with added network security, depending on how such firewalls are configured, the fastest transport methods may or may not be available currently, for use in transporting large (voluminous) digital media content. Eliminating diversity by forcing attempts using only the fastest transport methods, when such transport methods are not currently available, may result in media submission failure. As another example, while eliminating diversity by forcing use of only a "lowest common denominator" transport method may help with availability and ease of use, such transport method may provide only very poor transport speed and performance.

From the foregoing, it should be understood that such failure in media content submission or very poor transport speed may cause significant frustration and dissatisfaction on the part of content providers, such as the music or movie studios. Thus, there is a need for improved approaches to manage submission of media to an online media hosting site, where such cross-cutting concerns in transporting voluminous digital media content can be balanced.

SUMMARY

Broadly speaking, the invention relates to an improved system and method for submission of voluminous media content data. Automated transport mechanism selection may help to ease difficulties in balancing cross-cutting concerns in transporting the voluminous media. The cross-cutting concerns may relate to one or more aspects such as transport speed, security, cost, load balancing, user classification, reliability, convenience, ease of use, and current availability.

The invention can be implemented in numerous ways, including as a method, system, device, apparatus (including computer readable medium and graphical user interface). Several embodiments of the invention are discussed below.

One embodiment pertains to a method and/or system for transporting media content data over a network to a media submission system. A client media submission program may be provided that supports media submission to the media submission system using a plurality of transport mechanisms. One of the transport mechanisms to be utilized for the media submission may be determined based at least in part on configuration criteria. The media content data may be submitted over the network to the media submission system using the determined one of the transport mechanisms.

Another embodiment pertains to a computer readable medium including at least computer program code stored thereon for transporting media content data over a network to a media submission system. The computer program code can, for example, include at least: computer program code for client media submission to the media submission system using a plurality of transport mechanisms; computer program code for determining one of the transport mechanisms to be utilized for the media submission based at least in part on configuration criteria; and computer program code for submitting the media submission over the network to the media submission system using the determined one of the transport mechanisms.

Another embodiment pertains to an apparatus for transporting media content data over a Wide Area Network (WAN). The apparatus can, for example, include at least validation test logic and transport control logic. The validation test logic can be configured to determine a validation ranking of a plurality of transport mappings. Upon validating a selected transport mapping from among the plurality of transport mappings of the validation ranking, the validation test logic can be configured to designate the selected transport mapping as a validated transport mapping. The transport control logic can be configured to attempt delivery of the media content data over the WAN according to the validated transport mapping.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of certain embodiments of the invention are discussed below with reference to FIGS. 1-6. However, those skilled in the art will readily appreciate that the detailed description given herein with respect to these figures is for explanatory purposes as the invention extends beyond these limited embodiments.

Figure 1:
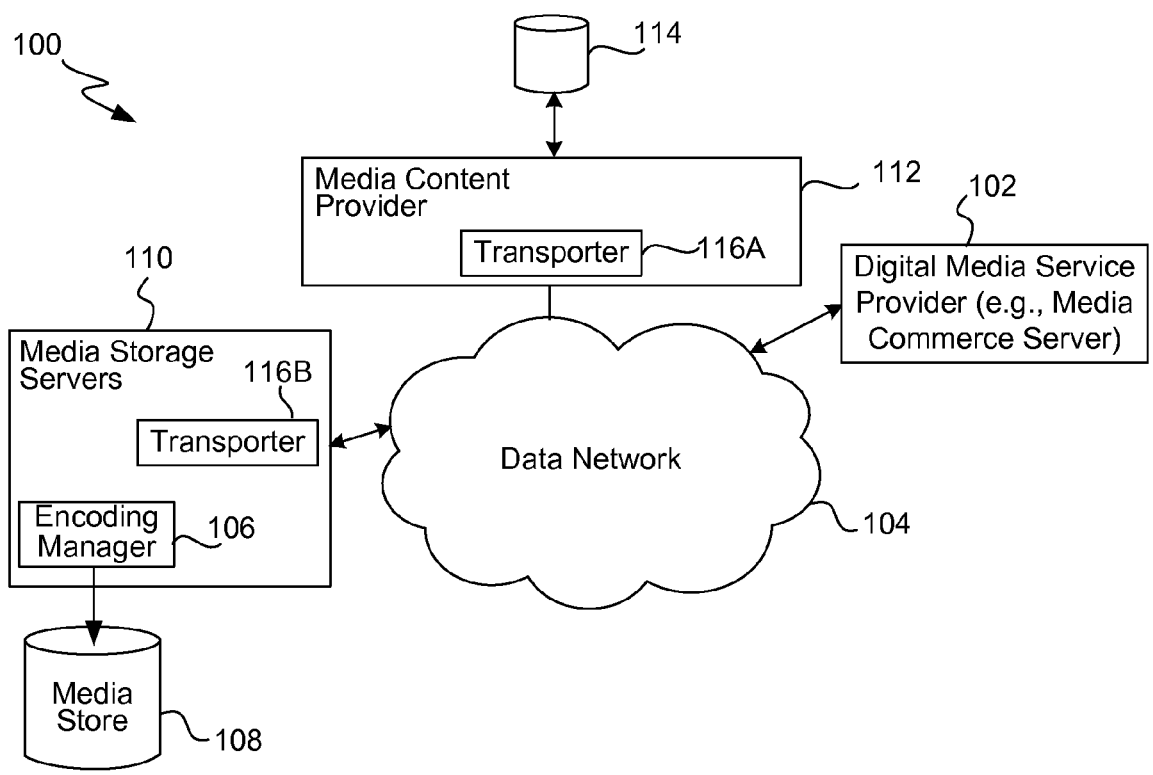
FIG. 1 is a block diagram of a media content submission and distribution system according to one embodiment.

FIG. 1 is a block diagram of a media content submission and distribution system 100 according to one embodiment. Media content submission and distribution system 100 may include a digital media service provider such as a media commerce server 102. Media commerce server 102 coordinates review, purchase, and/or rental of media items through on-line transactions. On-line transactions to purchase media items are also referred to as electronic commerce (e-commerce). In one embodiment, data network 104 includes at least a portion of the Internet.

In accordance with one embodiment, an encoding manager 106 encodes media items from metadata and data files containing media content. Encoding manager 106 can encode the media items as they are purchased or prior to purchase by a consumer.

In accordance with another embodiment, a medium store 108 stores or has access to media content that has been submitted to media content submission and distribution system 100. Media store 108 can provide mass storage for media content that is available for purchase via media content submission and distribution system 100. Thus, media store 108 may store media items that have been generated as well as store media content that have been submitted for distribution by media content and distribution system 100.

Media storage servers 110 represents one or more remote storage servers that couple to the data network 104. In media content and distribution system 100 shown in FIG. 1, the media content (e.g., media content and/or media items that have been encoded from the media content) are stored in media store 108 and retrieved via one or more media storage servers 110. Once purchased, the media items can be accessed from media store 108 over the data network 106 by way of media storage server 110.

Media content submission and distribution system 100 is accessible to one or more media content providers 112. A media content provider 112 may be, for example, a movie studio, television network, or record company providing media content that can be distributed via one or more digital media service providers (e.g., via a media distribution system). Each media content provider 112 may submit media content 114. As an example, media content can be submitted in association with a feature film or television episode. Generally, media content includes metadata and identifies a plurality of data files.

Submitted media content is typically very large. As mentioned previously, feature length movies encoded in ProRes 422 (HQ) may be as large as approximately six-hundred gigabytes or more. A Transporter may be embodied as an application or service directed to submission of voluminous media content data. Automation may help to ease difficulties in balancing cross-cutting concerns in transporting the voluminous media. Such cross-cutting concerns may relate to aspects such as transport speed, security, cost, load balancing, user classification, reliability, convenience, ease of use, and current availability.

The Transporter may be embodied as a centralized application or service, or as a distributed application or service. For example, as shown in FIG. 1, Transporter may operate in a distributed manner as a media content provider's Transporter client program 116A, and as respective Transporter server programs 116B of each of the Media Storage Servers 110. Initiation of some selected portions of Transporter functionality may be advantageously distributed to the Transporter client program 116A, while further implementation of the selected portions of Transporter functionality, in response to such initiation, may be advantageously distributed to the Transporter server program 116B. For example, initiating a Transport Control Protocol (TCP) diagnostic or a User Datagram Protocol (UDP) diagnostic (in part, to determine whether the content provider's network firewall is configured to provide current availability of TCP or UDP) may be advantageously distributed to the Transporter client program 116A, while further implementation may comprise echoing replies in response to the Transporter client program's TCP or UDP diagnostics, which may be advantageously distributed to the Transporter server program 116B.

Similarly, initiation of some other selected portions of Transporter functionality may be advantageously distributed to the Transporter server program 116B, while further implementation for such other selected portions of Transporter functionality in response to such initiation may be advantageously distributed to the Transporter client program 116A. For example, initiating load balancing of current server load through control messaging may be advantageously distributed to respective Transporter server programs 116B of each of the Media Storage Servers 110. Further implementing load balancing in response to server control messaging, through the Transporter client's selection of suitable transport mechanisms, may be advantageously distributed to the Transporter server program 116B.

Moreover, initiating overall balancing of cross-cutting concerns in transporting the voluminous media, relating to aspects such as transport speed, security, cost, load balancing, customer classification, reliability, convenience, and ease of use, may be advantageously distributed to the Transporter server program 116B. The Transporter server program 116B can provide and/or update configuration criteria to the Transporter client program 116A (and/or through providing and/or updating a preferred ranking related to the server's prioritized preferences with respect to different transport mechanisms, and/or through transmitting to the Transporter client program 116A validation (or invalidation, or undesignation) control messages related to server directives relative to the different transport mechanisms.)

Further implementing overall balancing of cross-cutting concerns, through the Transporter client's selection of suitable transport mechanisms in response to the server's configuration criteria (and/or to the server's preferred ranking, and/or to the server's validation (or invalidation, or undesignation) control messages), may be advantageously distributed to the Transporter client program 116A.

Figure 2:
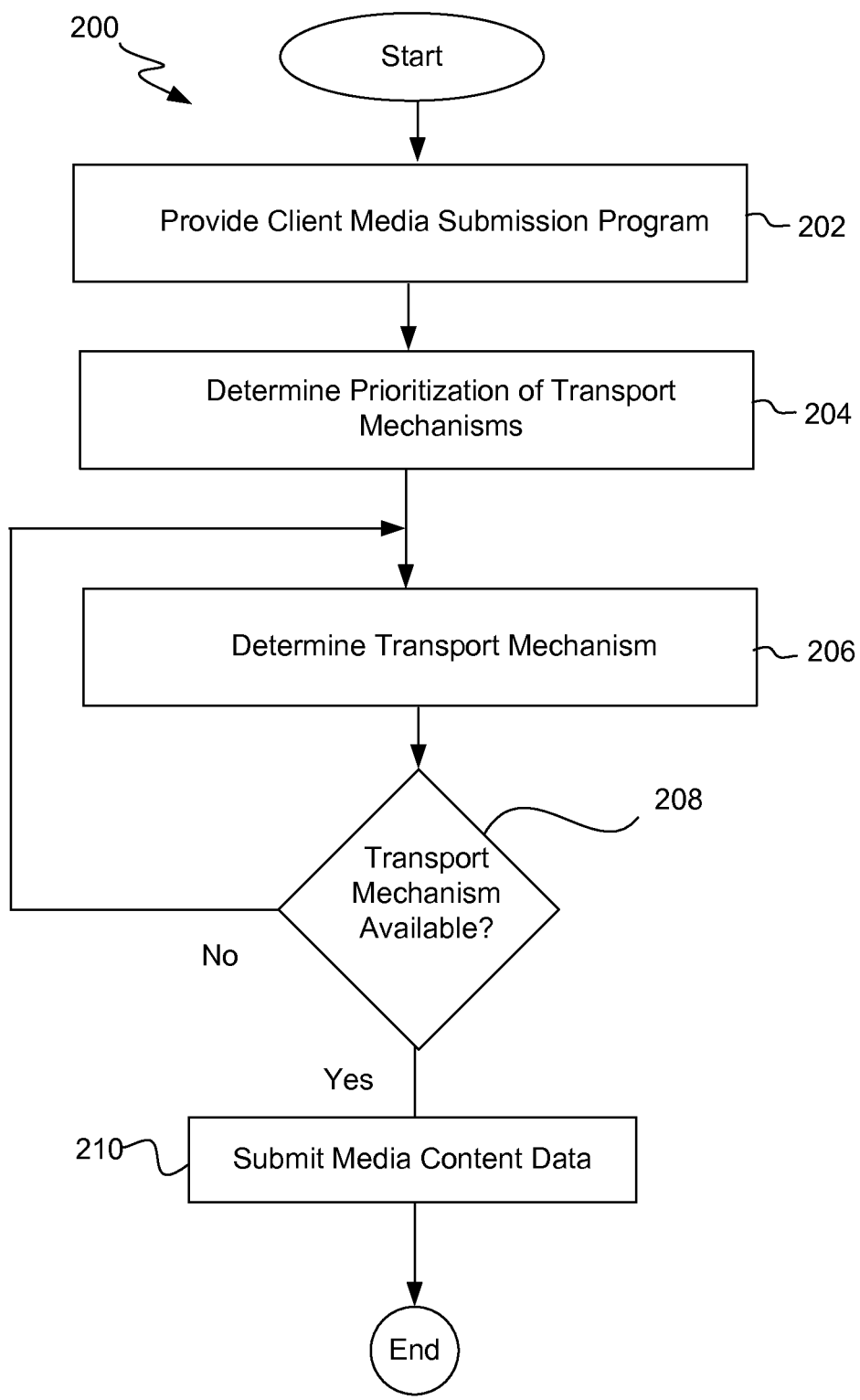
FIG. 2 is a process flow diagram illustrating a method of submitting media content data to a media submission system according to one embodiment.

FIG. 2 is a process flow diagram illustrating a method 200 of submitting voluminous media content data to the media submission system, according to one embodiment. The method 200 starts in FIG. 2, by providing a client media submission program 202 that supports media submission to the media submission system, using a plurality of transport mechanisms.

Priority of a plurality of transport mechanisms may be determined 204. For example, the plurality of transport mechanisms may be prioritized based on configuration criteria. The configuration criteria may be provided to the client media submission program by the media submission system.

One of the transport mechanisms to be utilized for the media submission may be determined 206. Such determination may be based, at least in part, on the configuration criteria. The determination of the one of the transport mechanisms to be utilized for the media submission may comprise checking its current availability. For example, in FIG. 2, decision block 208 indicates checking the transport mechanism's current availability. Depending upon the current availability of the transport mechanism, the media content data may be submitted 210 over the network to the media submission system, using the determined one of the transport mechanisms. Following the submission 210, the method 200 can end.

However, in case the determined one of the transport mechanisms is not currently available, the method may return to block 206 so that another transport mechanism can be determined. For example, if the determined one of the transport mechanisms employs a User Datagram Protocol (UDP), and if the afore-mentioned UDP diagnostic indicates that UDP is not currently available for connection to a desired one of the media storage servers of the media submission system (and hence the determined one of the transport mechanisms is unavailable), then the method may return to block 206. Accordingly, the method 200 may determine another one of the transport mechanisms to be utilized for the media submission, and so on, if the checking indicates that the determined one of the transport mechanisms is not currently available. For example, if the other one of the transport mechanisms does not employ UDP, and instead employs the Transport Control Protocol (TCP), and if the afore-mentioned TCP diagnostic indicates that TCP is currently available for connection to the desired media storage server of the media submission system, then decision block 208 finds affirmatively for the availability of the other one of the transport mechanisms.

Accordingly, with respect to the determined transport mechanism, such transport mechanism may be adapted for transporting the media submission from the client to one or more of the media storage servers of the media submission system using a determined one of a plurality of network protocols. Hence, the submitting may comprise the client submitting the media submission over the network to the media storage server using the determined one of the plurality of network protocols.

Additionally, the submitting may comprise the client submitting the media submission over the network to the media storage server of the media submission system using a determined one a plurality of non-real time Wide Area Network (WAN) protocols. Transport speed and efficiency may be compelling concerns, in choosing suitable transport protocols, since the media content files are so large. Such use of the non-real time WAN protocols may provide particular advantages, and may provide for the particular purpose of satisfying the concern over transport speed and efficiency.

Further with respect to the determined transport mechanism, each of the plurality of transport mechanisms may be identified using a respective one of a plurality of transport mappings. For example, for transport mechanisms adapted for transporting the media submission from the client to one or more of the media storage servers of the media submission system using determined ones of the plurality of network protocols, each transport mapping may comprise a respective protocol set identifier and a respective media storage server identifier. The media storage server identifiers may employ, for example, an Internet Protocol (IP) address. While the form of the identifier may vary, each identifier may uniquely identify a respective one of the media storage servers.

At least one of the transport mappings may be identified as a validated transport mapping. For example, when availability of the determined transport mechanism is validated, the transport mapping corresponding to the validated transport mechanism may be identified as a validated transport mapping. Determining the one of the transport mechanisms to be utilized for the media submission may be based, at least in part, on the validated transport mapping.

Similarly, at least one of the transport mappings may be identified as an invalidated transport mapping. For example, when availability of the determined transport mechanism is invalidated, the transport mapping corresponding to the invalidated transport mechanism may be identified as an invalidated transport mapping. Determining the one of the transport mechanisms to be utilized for the media submission may be based, at least in part, on the validated transport mapping. The one of the transport mechanisms identified by the invalidated transport mapping may be excluded from being utilized for the media submission.

In the following discussions of additional figures, it should be understood that "Logic", includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

Figure 3:
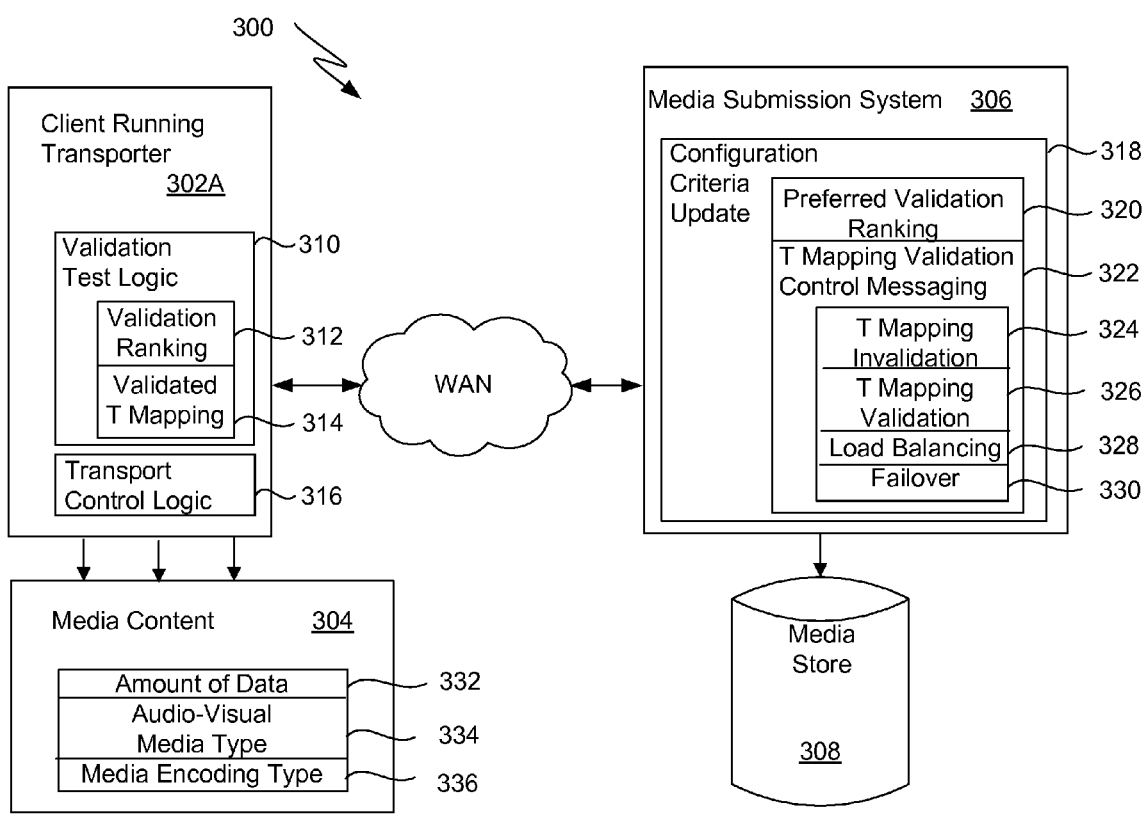
FIG. 3 is block diagram of the media content submission and distribution system according to another embodiment.

FIG. 3 is block diagram of the media content submission and distribution system 300 according to one embodiment. The media content submission and distribution system may be accessible to one or more media content providers using a client transporter program 302A operating on a client. Each media content provider may submit media content data 304 to the media submission system 306. The client transporter program 302A may transport the media content data 304 over a Wide Area Network (WAN) to the media submission system 306 for storage in the media store 308.

As a general matter, Wide Area Networks (WANs) may have high latency. However, use of the Wide Area Network (WAN) may still be preferred for a particular purpose of convenience, particularly when the content provider(s) and the transporter program 302A may be substantially remote from the media submission system. High latency of WANs may make selection of suitable transport mechanisms more difficult or complex. Automated transport mechanism selection may help to ease difficulties in balancing cross-cutting concerns in transporting the voluminous media over high latency WANs.

As shown in FIG. 3, the client may comprise validation test logic 310, which may be configured to determine a validation ranking 312 of a plurality of transport mappings. Upon validating a selected transport mapping from among the plurality of transport mappings of the validation ranking 312, the validation test logic 310 may be configured to designate the selected transport mapping as a validated transport mapping 314. As shown in FIG. 3, the client may further comprise transport control logic 316, which may be configured to attempt delivery of the media content data 304 over the WAN according to the validated transport mapping 314.

The media submission system 306 may initiate overall balancing of cross-cutting concerns in transporting the media content data 304, relating to aspects such as transport speed, security, cost, load balancing, customer classification, reliability, convenience, and ease of use. In particular, the media submission system 306 may provide and/or update configuration criteria to the client 302A. The client 302A may implement overall balancing of cross-cutting concerns based on the configuration criteria. Namely, the client's selection of suitable transport mechanisms can be based on the configuration criteria provided by the media submission system 306.

For example, the media submission system 306 may provide and/or update the client with a preferred validation ranking 320 of transport mappings, related to the media submission system's prioritized preferences with respect to different transport mechanisms. Also, through transport mapping validation control messaging 322, the media submission system 306 may invalidate 324 and/or validate 326 transport mappings that affect the client's validation test logic 310.

In particular, the media submission system may initiate load balancing 328 or failover 330 messages (and/or corresponding transport mapping validation/invalidation/undesignation control messages). In response thereto, the client's validation test logic 310 may be configured to determine the validation ranking 312 of the plurality of transport mappings.

Furthermore, in balancing the cross-cutting concerns, various different transport mechanism prioritizations are suited to various different kinds of media content. The larger an amount of data of the media content, the more important the transport speed, at the expense of server load and transport cost. With respect to type of audio-visual media, music files are typically smaller, so transport speed may be less important, relative to importance of transport cost savings. With respect to different media encoding types, some result in more compact files sizes than others. Accordingly, as shown in FIG. 3, the client's validation test logic 310 may be configured to determine the validation ranking 312 of the plurality of transport mappings, based at least in part upon: a measure of an amount of data 332 of the media content data, or an audio-visual media type 334 of the media content data, or a media encoding type 336 of the voluminous media content data. Similarly, the client's validation test logic 310 may be configured to determine the validation ranking 312 of the plurality of transport mappings, based at least upon other factors, such as quality of service terms or legal terms negotiated by the media content provider.

Figure 4:
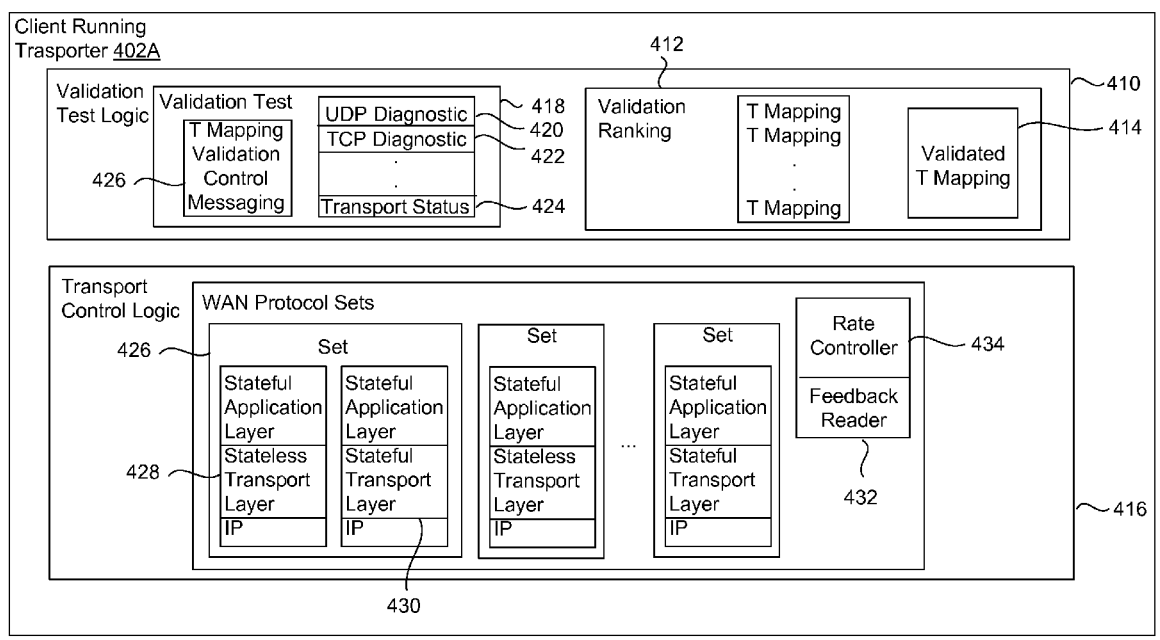
FIG. 4 is a block diagram illustrating a client media submission program that supports media submission to the media submission system using a plurality of transport mechanisms.

FIG. 4 is a block diagram illustrating a client media submission program that supports media submission to the media content submission and distribution system using a plurality of transport mechanisms. The client transporter program 402A shown in FIG. 4 transports the media content data over the Wide Area Network (WAN). The client may comprise validation test logic 410, which may be configured to determine a validation ranking 412 of a plurality of transport mappings 413. Upon validating a selected transport mapping from among the plurality of transport mappings of the validation ranking 412, the validation test logic 410 may be configured to designate the selected transport mapping as a validated transport mapping 414. Transport control logic 416 may be configured to attempt delivery of the media content data over the WAN according to the validated transport mapping 414. Upon any invalidation of any member or members of the plurality of transport mappings 413, the validation test logic may be configured to determine iteratively the validation ranking 412 of the plurality of transport mappings 413.

The validation test logic 410 may be configured to accommodate one or more validation test modules 418. The validation ranking 412 may be used for prioritizing selection of a transport mapping for validation test. Upon favorable validation test determination by the validation test module 418 of availability of a selected transport mechanism identified by the selected transport mapping, the selected transport mapping may be designated by the validation test logic 412 as the validated transport mapping 414. Upon any invalidation of any member or members of the plurality of transport mappings due to unfavorable validation test 418 determination, the validation test logic 410 may be configured to determine iteratively the validation ranking 412 of the plurality of transport mappings 413.

Various diagnostics and/or tests may be employed. As an example illustrating both a particular diagnostic and an unfavorable test determination, if the UDP diagnostic 420 indicates that a selected transport mechanism requiring UDP is not currently available for connection to a desired one of the media storage servers of the media submission system, then the validation test logic 410 may invalidate the selected transport mapping identifying the selected transport mechanism.

As an example illustrating both another diagnostic and a favorable test determination, if the TCP diagnostic 422 indicates that a selected transport mechanism requiring only TCP (and not UDP) is currently available for connection to a desired one of the media storage servers of the media submission system, then the validation test logic 410 may validate the selected transport mapping identifying the selected transport mechanism, and delivery of the media content data over the WAN according to the validated transport mapping 414 may be attempted.

The validation test module 418 of the validation test logic 410 may be configured to determine transport status 424, indicating a success or a failure of transport of the media content data over the WAN in accordance with the validated transport mapping. The validation test logic 410 may invalidate the validated transport mapping based upon the transport status 424 indicating the failure of transport of the media content data over the WAN in accordance with the validated transport mapping. Upon any invalidation of the validated transport mapping due to the transport status 424 indicating the failure of transport of the media content data over the WAN in accordance with the validated transport mapping, the validation test logic may be configured to determine the validation ranking of the plurality of transport mappings.

As discussed, testing may be performed, and validation/invalidation decisions may be made locally. Alternatively, they may be done remotely. The validation test module 418 may further comprise transport mapping validation control messaging 426 for receiving control messages from the content submission system, and/or from one or more storage servers of the content submission system. As discussed previously herein, in response to receiving such transport mapping validation control messages, the validation control logic 410 may invalidate one or more transport mappings; or may validate one or more transport mappings; or may undesignate one or more transport mappings. In particular, a transport mapping already designated as a validated transport mapping may be undesignated as such; and a transport mapping already designated as an invalid transport mapping may be undesignated as such.

FIG. 4 further shows a plurality of WAN protocol sets, which are identified by the transported mappings. At least one WAN protocol set comprises at least one multilayer WAN protocol having a stateless transport layer protocol.

At least one WAN protocol set 426 comprises a pair of multilayer WAN protocols, wherein a first member of the pair has a stateless transport layer protocol 428 for transporting the media content data, and the other member of the pair has a stateful transport layer 430 for transporting flow rate feedback data, which can be used in controlling flow rate of the media content data of the first member. FIG. 4 shows a feedback reader 432 for reading the flow rate feedback data, and a rate controller 434 for use in controlling flow rate of the media content data of the first member.

Figure 5A:
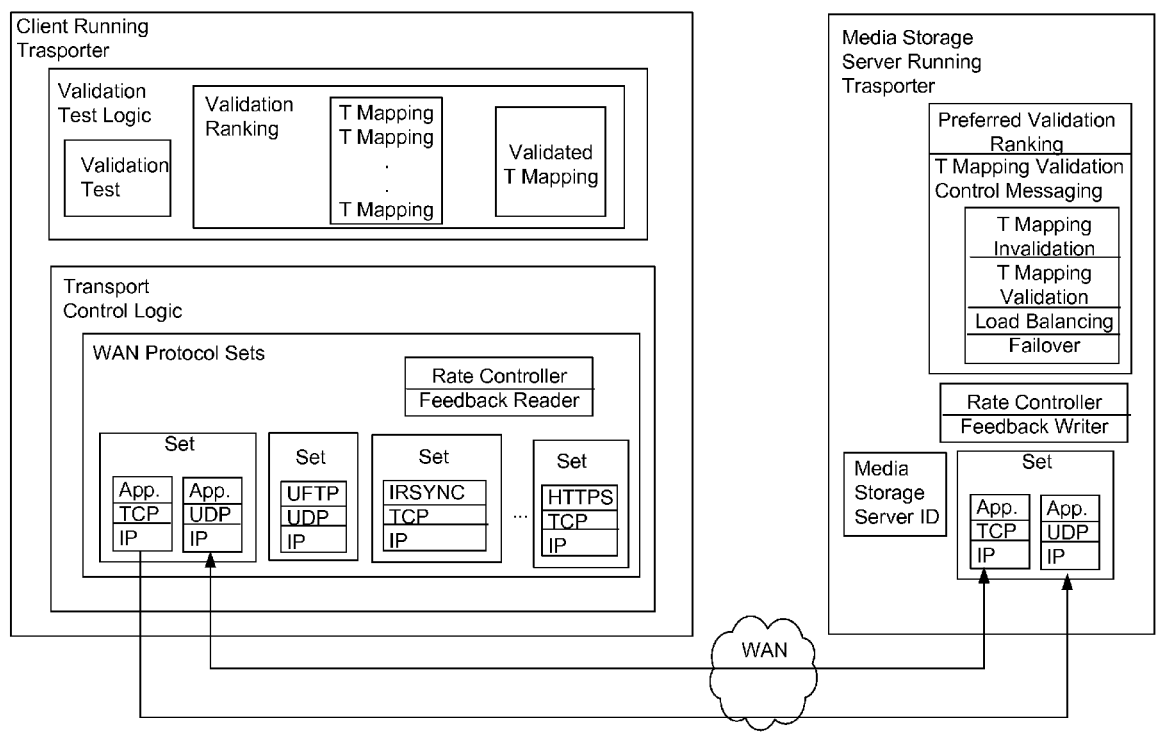
FIGS. 5A-5C are block diagrams of the media content submission and distribution system according to additional embodiments.
Figure 5B:
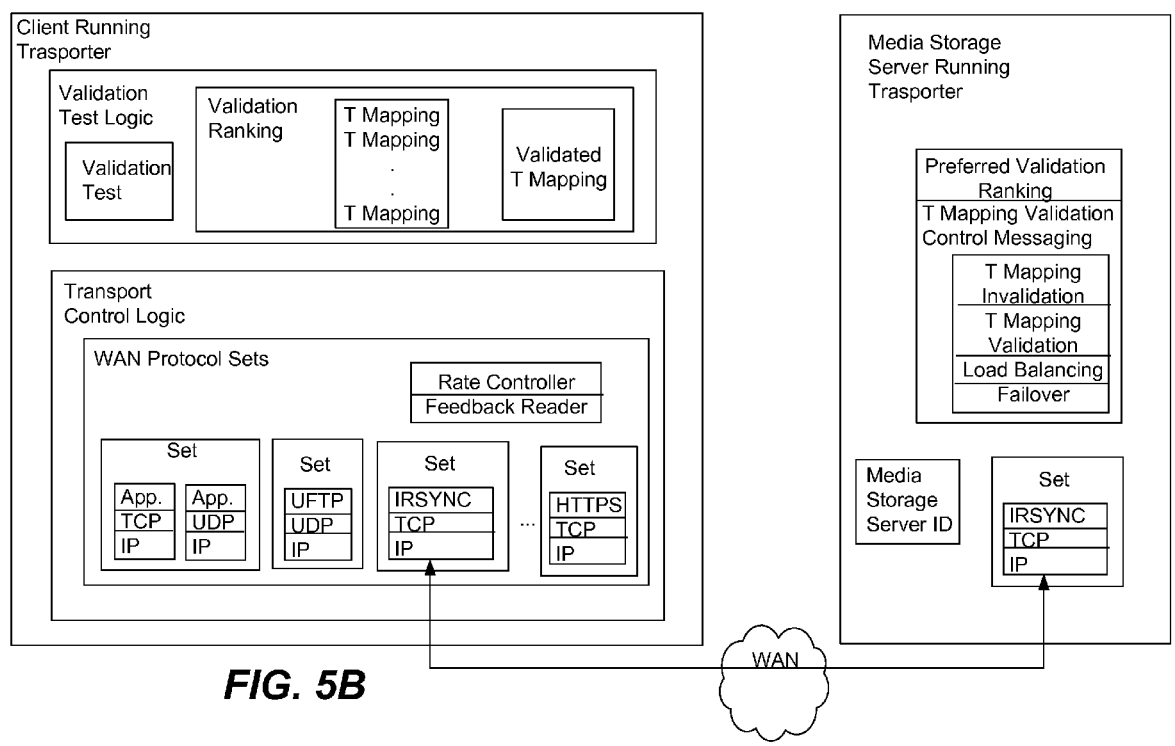
Figure 5C:
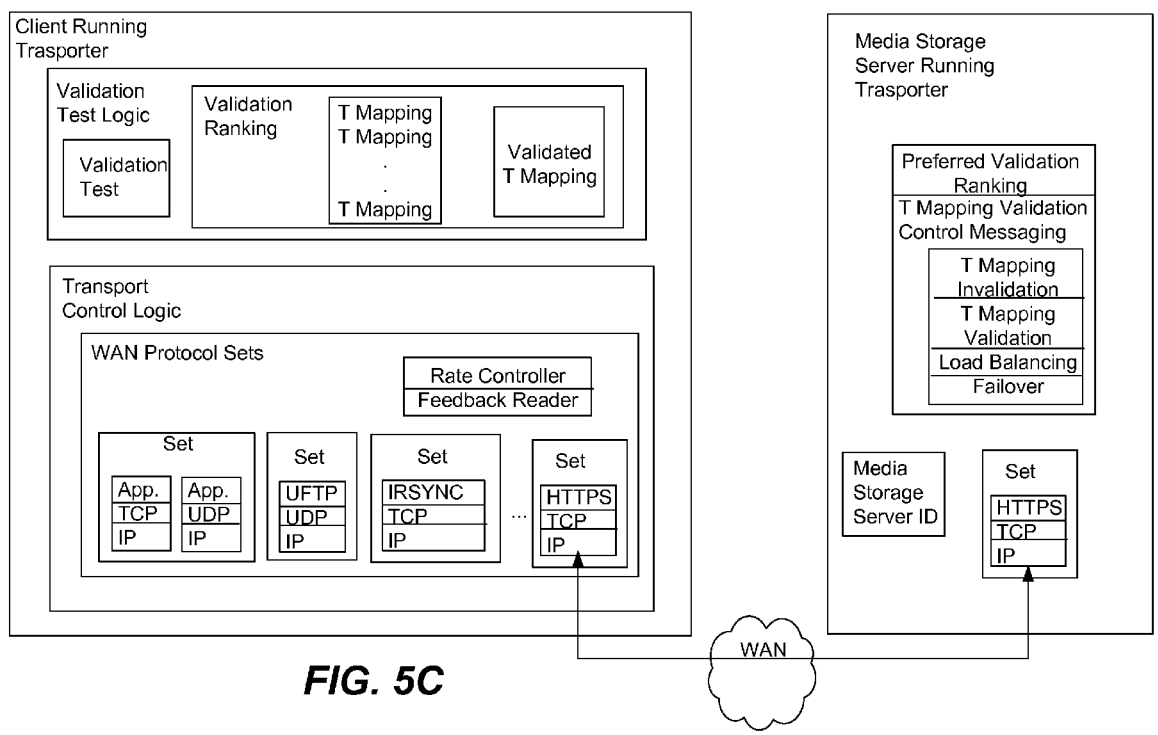

FIGS. 5A-5C are block diagrams of the media content submission and distribution system according to additional embodiments. In FIGS. 5A-5C the media storage servers embody many of the functionalities already discussed in detail with respect to the media submission system of FIG. 3. Each of the media storage servers is identified by a respective media storage server identifier. In FIGS. 5A-5C the clients are generally similar to the client of FIG. 4, already discussed in detail previously herein. FIGS. 5A-5C particularly illustrate that the client may support media submission to one or more storage servers of the media submission system using a plurality of selectable transport mechanisms.

The transport mechanism illustrated in FIG. 5A may achieve a high transport speed, and accord a preferred top priority in the validation ranking. As shown, one WAN protocol set comprises a pair of multilayer WAN protocols, wherein a first member of the pair has a UDP transport layer protocol for transporting the media content data, and the other member of the pair has a TCP transport layer for transporting flow rate feedback data, for use in controlling flow rate of the media content data of the first member.

A transport mechanism employing the IRSNYC protocol as illustrated in FIG. 5B may help in avoiding any unnecessary transporting of portions the media content to the media storage server, by transporting media content difference data, to any extent that differences may exist relative to any media content already on the media storage server. Some similar benefits may flow from using the RSYNC protocol in combination with an SSH shell, instead of the IRSYNC protocol.

FIG. 5C illustrates a transport mechanism employing the HTTPS and TCP multilayer protocol. While transport using HTTPS on top of TCP may be substantially slower than other alternative transport mechanisms employing UDP, HTTPS on top of TCP may be available in cases where UDP based alternatives are unavailable.

Figure 6:
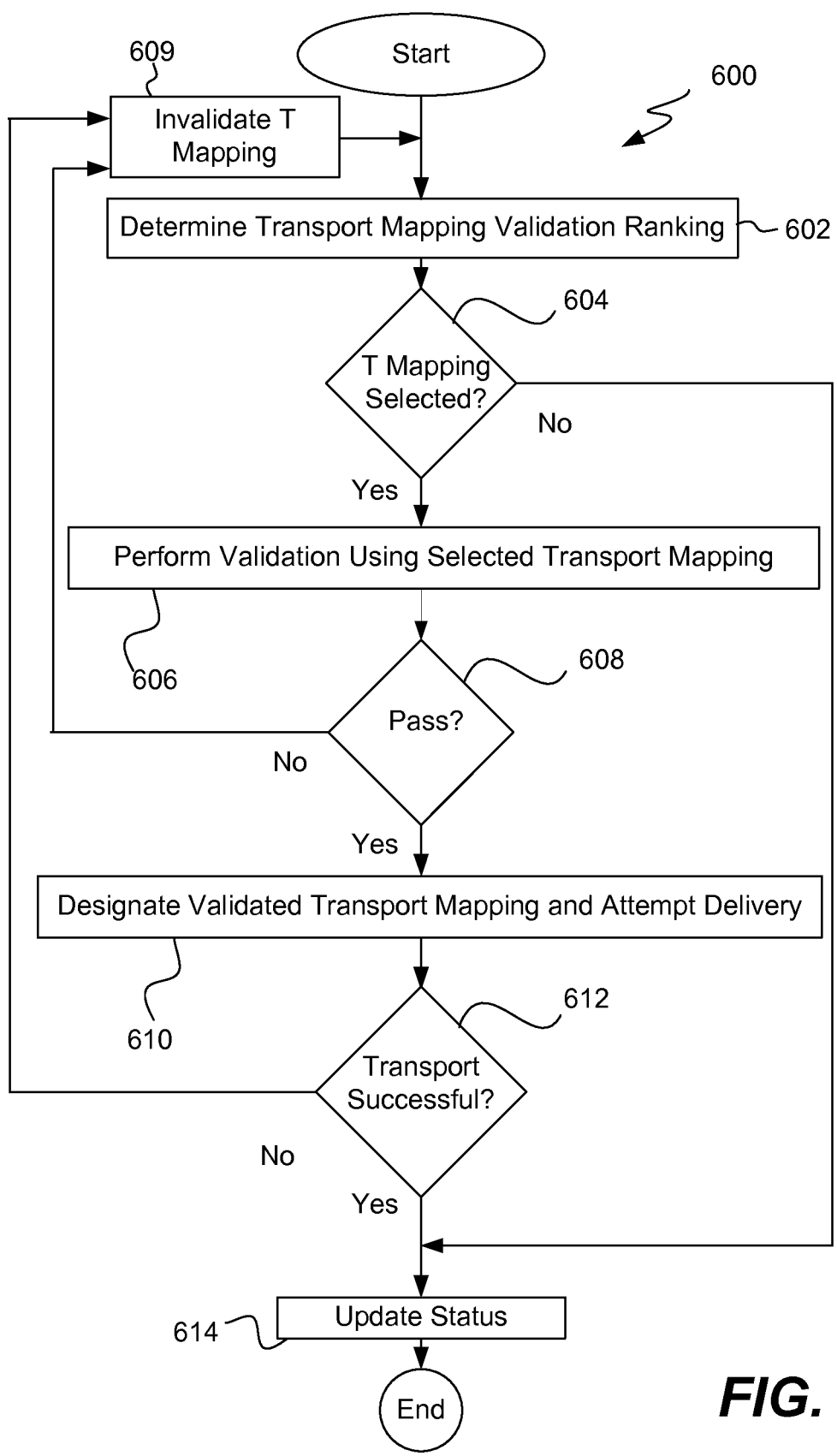
FIG. 6 is a process flow diagram illustrating a method of submitting media content data to the media submission system according to another embodiment.

FIG. 6 is a process flow diagram illustrating a method 600 of submitting media content data to a media submission system according to another embodiment. The method 600 can start with determining a validation ranking 602 of a plurality of transport mappings. The validation ranking may be used for prioritizing selection of a transport mapping for performing validation. At decision block 604, no transport mappings may be selected if no transport mechanisms are available, and if all transport mappings have been invalidated. In such negative case, status may be updated 614 to the effect that no transport mechanisms are available, and the method 600 can end.

At decision block 604, in an affirmative case, a transport mapping having a top priority in the validation ranking may be selected. Validation may be performed 606 on the selected transport mapping.

At decision block 608 the selected transport mechanism identified by the selected transport mapping may not pass validation, for example, if the selected transport mechanism is unavailable. In such negative case, the selected transport mapping may be invalidated 609, and the validation ranking may again be determined 602, now taking into account the transport mapping invalidation.

At decision block 608, in an affirmative case the selected transport mechanism identified by the selected transport mapping may pass validation. Upon validating the selected transport mapping, the selected transport mapping may be designated as a validated transport mapping. The delivery of the media content data over the WAN according to the validated transport mapping may then be attempted 610.

At decision block 612, the attempted delivery over the WAN according to the validated transport mapping may be unsuccessful. In such negative case, the validated transport mapping may be invalidated 609. At decision block 612, in an affirmative case the attempted deliver is successful, the status is so updated 614, and the method 600 can end.

The invention can be implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The various aspects, features, embodiments or implementations of the invention described above can be used alone or in various combinations. Embodiments of the invention can, for example, be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The advantages of the invention are numerous. The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer implemented method for transporting media content data over a network to a media submission system, the method comprising:
    providing a client media submission program that supports media submission to the media submission system using a plurality of transport mechanisms;
    obtaining configuration criteria at the client media submission program from the media submission system;
    providing a client validation of the configuration criteria from the media submission system, by validating at the client media submission program at least a portion of the configuration criteria from the media submission system, the validating comprises ranking the transport mechanisms based at least in part on at least one of (i) media type of the media content data, (ii) size of the media content data or (iii) media encoding type of the media content data;
    determining one of the transport mechanisms to be utilized for the media submission based at least in part on the rank of the transport mechanisms provided by the client validation of the configuration criteria from the media submission system; and
    submitting the media content data over the network to the media submission system using the determined one of the transport mechanisms, wherein the submitting uses the client media submission program to submit the media content data over the network to a media storage server using the determined one of the transport mechanisms.

2. A computer implemented method as recited in claim 1, wherein the validating comprises checking current availability of one of the transport mechanisms.

3. A computer implemented method as recited in claim 2, wherein the validating comprises validating another one of the transport mechanisms to be utilized for the media submission if the checking indicates the one of the transport mechanisms is not currently available.

4. A computer implemented method as recited in claim 1, wherein the plurality of transport mechanisms are prioritized based on the configuration criteria.

5. A computer implemented method as recited in claim 1, further comprising providing load balancing of media submissions from different client media submission programs by the media submission system using the configuration criteria to direct media submission over the determined one of the transport mechanisms.

6. A computer implemented method as recited in claim 1, wherein the submitting comprises the client submitting the media submission over the network to the media storage server using a determined one a plurality of network protocols.

7. A computer implemented method as recited in claim 1, wherein the submitting comprises the client submitting the media submission over the network to the media storage server using a determined one of a plurality of non-real time Wide Area Network (WAN) protocols.

8. A computer implemented method as recited in claim 1, wherein the determining comprises:
    identifying each of the plurality of transport mechanisms using a respective one of a plurality of transport mappings;
    identifying at least one of the transport mappings as a validated transport mapping; and
    determining one of the transport mechanisms to be utilized for the media submission based at least in part on the validated transport mapping.

9. A computer implemented method as recited in claim 1, wherein the determining comprises:
    identifying each of the plurality of transport mechanisms using a respective one of a plurality of transport mappings;
    identifying at least one of the transport mappings as an invalidated transport mapping; and
    excluding the one of the transport mechanisms identified by the invalidated transport mapping from being utilized for the media submission.

10. A non-transitory computer readable medium including at least computer program code stored thereon for transporting media content data over a network to a media submission system, the computer readable medium comprising:
    computer program code for client media submission to the media submission system using a plurality of transport mechanisms;
    computer program code for obtaining configuration criteria from the media submission system;
    computer program code for client validation of the configuration criteria from the media submission system, the client validation comprises ranking the transport mechanisms based at least in part on at least one of (i) media type of the media content data, (ii) size of the media content data or (iii) media encoding type of the media content data;
    computer program code for determining one of the transport mechanisms to be utilized for the media submission based at least in part on the rank of the transport mechanisms provided by the client validation; and
    computer program code for submitting the media submission over the network to the media submission system using the determined one of the transport mechanisms, wherein the media submission is over a network to a media storage server using the determined one of the transport mechanisms.

11. A computer implemented method for transporting media content data over a Wide Area Network (WAN) to a media submission system, the method comprising:
  receiving a validation ranking of a plurality of transport mappings that are potentially available to transport data to the media submission system, the validation ranking ranks the transport mechanisms based at least in part on at least one of (i) media type of the media content data, (ii) size of the media content data or (iii) media encoding type of the media content data;
  selecting a transport mapping from the media submission system based at least in part on the validation ranking;
  validating the selected transport mapping from the media submission system;
  upon validating the selected transport mapping from the media submission system, designating the selected transport mapping from the media submission system as a validated transport mapping from the media submission system; and
  attempting delivery of the media content data over the WAN according to the validated transport mapping from the media submission system,
  wherein if the attempting of delivery of the media content data over the WAN is successful, the media content data is provided to the media submission system.

12. A computer implemented method as recited in claim 11, further comprising:
  determining a transport status indicating a success or a failure of transport of the media content data over the WAN in accordance with the validated transport mapping;
  upon the transport status indicating the failure of transport of the media content data over the WAN in accordance with the validated transport mapping, invalidating the validated transport mapping; and
  upon such invalidation of the validated transport mapping, determining the validation ranking of the plurality of transport mappings.

13. A computer implemented method as recited in claim 11, further comprising, in response to a validation control message received from the media submission system, determining the validation ranking of the plurality of transport mappings.

14. A computer implemented method as recited in claim 11, further comprising providing a plurality of non-real time WAN protocol sets, wherein the attempting delivery comprises attempting delivery using at least one of the non-real time WAN protocol sets.

15. A computer implemented method as recited in claim 11, further comprising at least one of:
  designating one of the plurality of transport mappings as the validated transport mapping in response to messaging from a media storage server; and
  invalidating at least one of the plurality of transport mappings in response to messaging from the media storage server.

16. An apparatus for transporting media content data over a Wide Area Network (WAN) to a media submission system, the apparatus comprising:
  a computing device including at least validation test logic and transport control logic,
  wherein the computing device receives a plurality of transport mappings from the media submission system,
  wherein the validation test logic determines a validation ranking of the plurality of transport mappings from the media submission system, the validation ranking ranks the transport mappings based at least in part on at least one of (i) media type of the media content data, (ii) size of the media content data or (iii) media encoding type of the media content data,
  wherein upon validating a selected transport mapping from among the plurality of transport mappings from the media submission system, the validation test logic designates the selected transport mapping as a validated transport mapping from the media submission system,
  wherein the transport control logic attempts delivery of the media content data over the WAN according to the validated transport mapping from the media submission system, and
  wherein if the attempting of delivery of the media content data over the WAN via the transport control logic is successful, the media content data is provided to the media submission system.

17. An apparatus as recited in claim 16, wherein the validation test logic is configured to determine transport status, indicating a success or a failure of transport of the media content data over the WAN in accordance with the validated transport mapping, and to invalidate the validated transport mapping based upon the transport status indicating the failure of transport of the media content data over the WAN in accordance with the validated transport mapping.

18. An apparatus as recited in claim 17, wherein, upon any invalidation of the validated transport mapping due to the transport status indicating the failure of transport of the media content data over the WAN in accordance with the validated transport mapping, the validation test logic is configured to determine the validation ranking of the plurality of transport mappings.

19. An apparatus as recited in claim 16, wherein, in response to a preferred validation ranking provided by the media submission system, the validation test logic is configured to determine the validation ranking of the plurality of transport mappings.

20. An apparatus as recited in claim 16, wherein, in response to load balancing data provided by one or more of a plurality of media storage servers, the validation test logic is configured to determine the validation ranking of the plurality of transport mappings.

21. An apparatus as recited in claim 16, wherein, upon any invalidation of any member or members of the plurality of transport mappings due to unfavorable test determination, the validation test logic is configured to determine iteratively the validation ranking of the plurality of transport mappings.

22. An apparatus as recited in claim 16, wherein, upon any invalidation of any member or members of the plurality of transport mappings, the validation test logic is configured to determine iteratively the validation ranking of the plurality of transport mappings.

23. An apparatus as recited in claim 16, further comprising a plurality of different non-real time WAN protocol sets, wherein the transport control logic configured to attempt delivery using at least one of the non-real time WAN protocol sets.

24. An apparatus as recited in claim 16, further comprising a plurality of WAN protocol sets, wherein at least one WAN protocol set comprises at least one multilayer WAN protocol having a stateless transport layer protocol.

25. An apparatus as recited in claim 16, further comprising a plurality of WAN protocol sets, wherein at least one WAN protocol set comprises a pair of multilayer WAN protocols, wherein a first member of the pair has a stateless transport layer protocol for transporting the media content data, and the other member of the pair has a stateful transport layer for transporting flow rate feedback data, for use in controlling flow rate of the media content data of the first member.

* * * * *